United States Patent
Ponnusamy

(10) Patent No.: US 11,915,169 B2
(45) Date of Patent: *Feb. 27, 2024

(54) METHOD FOR DETERMINING AMOUNT OF TIME SPENT ON A TASK AND ESTIMATING AMOUNT OF TIME REQUIRED TO COMPLETE THE TASK

(71) Applicant: Clari Inc., Sunnyvale, CA (US)

(72) Inventor: Rajkumar Ponnusamy, Sunnyvale, CA (US)

(73) Assignee: CLARI INC., Sunnyvale, CA (US)

( * ) Notice: Subject to any disclaimer, the term of this patent is extended or adjusted under 35 U.S.C. 154(b) by 182 days.

This patent is subject to a terminal disclaimer.

(21) Appl. No.: 17/226,959

(22) Filed: Apr. 9, 2021

(65) Prior Publication Data

US 2021/0224722 A1    Jul. 22, 2021

Related U.S. Application Data

(63) Continuation of application No. 16/163,560, filed on Oct. 17, 2018, now Pat. No. 10,997,536, which is a continuation-in-part of application No. 15/885,048, filed on Jan. 31, 2018, now Pat. No. 10,936,623.

(51) Int. Cl.
G06Q 10/0631    (2023.01)
G06Q 10/0639    (2023.01)
G06Q 10/1091    (2023.01)

(52) U.S. Cl.
CPC ........ G06Q 10/063114 (2013.01); G06Q 10/06393 (2013.01); G06Q 10/1091 (2013.01)

(58) Field of Classification Search
CPC ..... G06Q 10/063114; G06Q 10/06393; G06Q 10/1091

USPC ........................................................ 707/610
See application file for complete search history.

(56) References Cited

U.S. PATENT DOCUMENTS

| | | | |
|---|---|---|---|
| 8,694,487 B2 * | 4/2014 | Lamothe | G06Q 10/06 707/610 |
| 10,438,172 B2 | 10/2019 | Rangan | |
| 2006/0080363 A1 | 4/2006 | Vadlamani et al. | |
| 2011/0125547 A1* | 5/2011 | Brdiczka | G06Q 10/063 706/54 |
| 2013/0226639 A1 | 8/2013 | Yokoyama et al. | |
| 2016/0148170 A1 | 5/2016 | Fitzpatrick et al. | |

(Continued)

*Primary Examiner* — Hosain T Alam
*Assistant Examiner* — Nicholas E Allen
(74) *Attorney, Agent, or Firm* — WOMBLE BOND DICKINSON (US) LLP

(57) ABSTRACT

In an embodiment, a cloud server determines a point in time in a current task, and identifies a corresponding point in time in each of a number of completed tasks retrieved from a first database. User activity data from a second database is used to calculate time spent on the current task up to the identified point in time, a ratio between time spent on each completed task after the corresponding point in time and time spent on the completed task before the corresponding point in time. The cloud server also calculates a similarity score between each completed task and the current task based on a number of parameters and using a predetermined algorithm. A weighted arithmetic mean of the time ratios can be calculated using the similarity scores as weights, and can be used in conjunction with the time spent on the current task up to the identified point in time, to calculate time required to complete the current task.

21 Claims, 10 Drawing Sheets

(56) References Cited

U.S. PATENT DOCUMENTS

| | | |
|---|---|---|
| 2016/0224939 A1 | 8/2016 | Chen et al. |
| 2017/0083871 A1 | 3/2017 | Chang et al. |
| 2017/0186334 A1 | 6/2017 | Sasidhar et al. |
| 2017/0200133 A1* | 7/2017 | Werner .............. G06Q 10/0633 |
| 2017/0249574 A1* | 8/2017 | Knijnik ............ G06Q 10/06313 |
| 2017/0300844 A1 | 10/2017 | Urry et al. |
| 2019/0213557 A1 | 7/2019 | Dotan-Cohen et al. |

* cited by examiner

US 11,915,169 B2

METHOD FOR DETERMINING AMOUNT OF TIME SPENT ON A TASK AND ESTIMATING AMOUNT OF TIME REQUIRED TO COMPLETE THE TASK

RELATED APPLICATIONS

This application is a continuation of U.S. patent application No. 16/163,560, filed Oct. 17, 2018, which is a continuation-in-part (CIP) of U.S. patent application Ser. No. 15/885,048, filed Jan. 31, 2018. The disclosure of the aforementioned applications is incorporated by reference herein in its entirety.

FIELD OF THE INVENTION

Embodiments of the present invention relate generally to cloud servers and data processing systems. More particularly, embodiments of the invention relate to methods and systems for estimating time required to complete a task based on historical data and time already spent on the task.

BACKGROUND

In today's organizations, estimating time required to complete certain tasks can play an important role in budgeting, resource allocation, work prioritization, and performance assessment.

For example, with an estimated time required to complete each task assigned to a task performer, the task performer can determine which task to work on first, so that the task performer's productivity can be improved for a particular evaluation period. Such estimation can also provide deeper quantitative visibility into a task performer's performance and effectiveness.

Task performers typically rely on gut feelings and past experiences to estimate time required to complete a particular task, which is unreliable and inconsistent. What is needed is a systematic approach that is based on factual data to make such estimations.

BRIEF DESCRIPTION OF THE DRAWINGS

Embodiments of the invention are illustrated by way of example and not limited to the figures of the accompanying drawings in which like references indicate similar elements.

DETAILED DESCRIPTION

Figure 1:
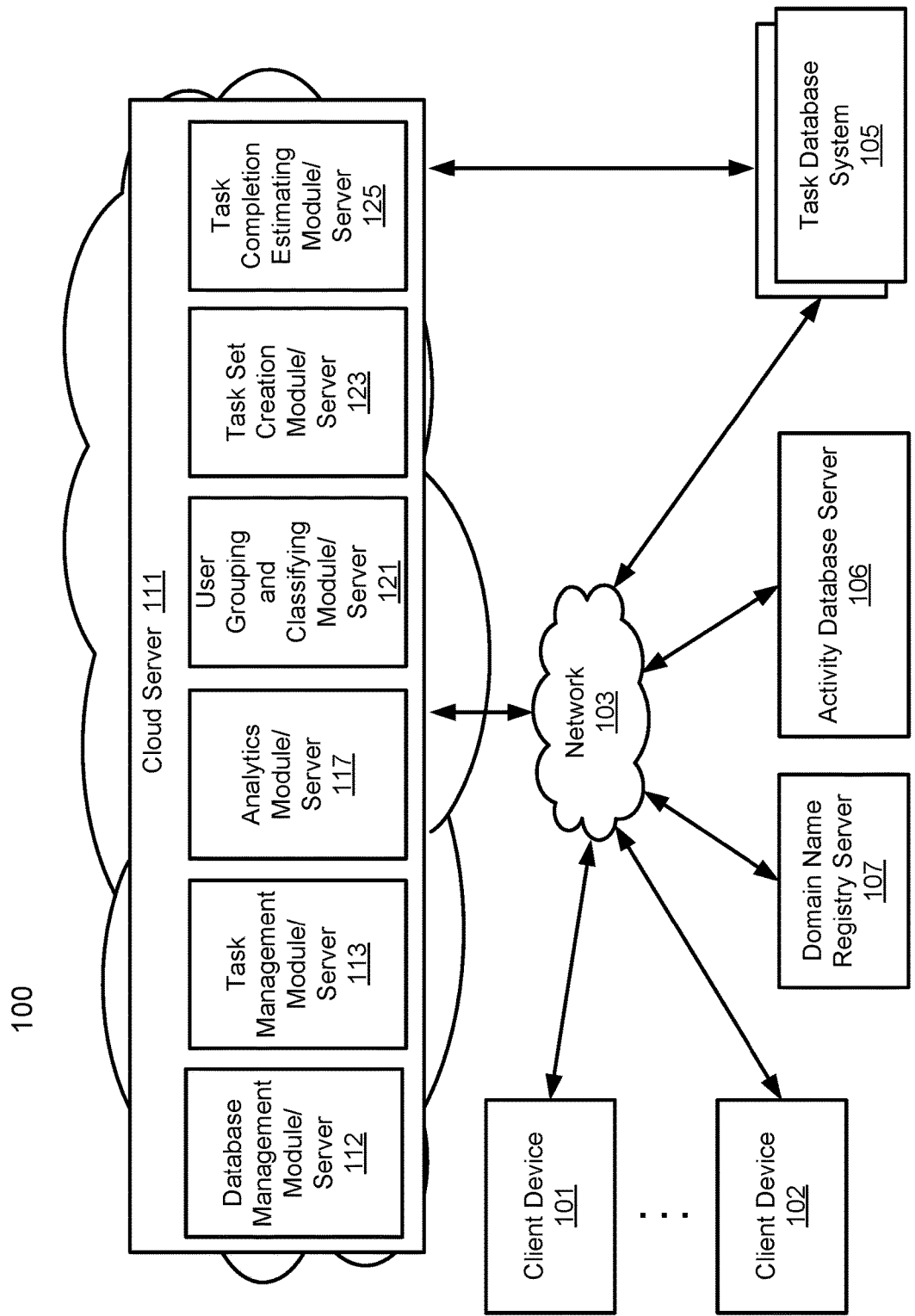
FIG. 1 is a block diagram illustrating a network configuration according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to an embodiment, described herein is a system and method for estimating time required to complete a current task. A cloud server, in response to receiving a request for estimating time required to complete the current task, determines a point in time that the current task has progressed to in a life cycle of the current task. The cloud server, which is communicatively coupled to a task database system and an activity database server, identifies a number of completed tasks from the task database system, where each completed task shares one or more characteristics with the current task. A characteristic of a task can include but not limited to a task value, a task originating region, or a task product mix.

For each completed task, the cloud server further calculates a similarity score representing a similarity between the completed task and the current task using a predetermined algorithm; and a time ratio of a first amount of time spent on the completed task after a point in time corresponding to the determined point in time in the current task and a second amount of time spent on the completed task before the corresponding point in time. The time spent on each completed task before and after the corresponding point in time can be calculated based on user activity data retrieved by the cloud server from the activity database server. A similarity score can be a number between 0 and 1, including 0 and 1.

The cloud server further calculates a weighted arithmetic mean of the time ratios for the completed tasks using the similarity score for each completed task as the corresponding weight, and a total amount of time spent on the current task up to the determined point in time using data from the activity database server. Finally, the cloud server can calculate the amount of time required to complete the current task by multiplying the weighted arithmetic mean and the total amount time spent on the current task up to the determined point in time.

In an embodiment, the user activity data includes but not limited to emails sent or received, phone calls, and meetings. The cloud server can calculate the first amount of time, the second amount of time, and the total amount of time spent on the current task up to the determined point in time using a duration of each phone call, a duration of each meeting, and an estimated duration of time spent on each email sent or received. The duration of time spent on each email sent is estimated based on a predetermined duration of time writing a predetermined number of words by an average person, and the duration of time spent on each email received is estimated based on a predetermined duration of time reading the predetermined number of words by an average person. The time spent by an average person in writing or reading a predetermined number of words can be an average amount of time calculated from a number of persons using statistical methods.

In an embodiment, when calculating the similar scores, the predetermined algorithm can use one or more characteristics shared between the current task and each completed tasks, including include one or more of a task value, a task originating region, or a task product mix.

Although various embodiments of the invention are implemented in a cloud server environment in this disclosure, they can be similarly implemented in an on-premises environment.

Cloud Server

FIG. 1 is a block diagram illustrating a network configuration according to one embodiment of the invention. Referring to FIG. 1, system 100 includes, but is not limited to, one or more client systems 101-102 communicatively coupled to servers 105-107 and an AI-driven cloud server 111 over network 103.

Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Network 103 may be any type of networks such as a local area network (LAN), a wide area network (WAN) such as the Internet, or a combination thereof, wired or wireless.

Servers 105-107 can be any kinds of servers or a cluster of servers, such as, for example, Web servers, application servers, cloud servers, backend servers, etc. Task database server 105 provides task data services and data to a variety of clients, which may be periodically or constantly accessed and updated by the clients for managing their task management data. In one embodiment, the task database system can be a CRM system.

In an embodiment, the cloud platform server 111 can be provided between client devices 101-102 and the task database system 105. Users at client devices 101-102 can log in to the cloud server 111, which can utilize services and data provided by the task database server 105. As such, the cloud server 111 operates to add a layer of intelligence to the task database system 105.

In an embodiment, the cloud server 111 provides a number of predictive algorithms based on AI and machine learning technologies, for use in identifying risks and delivering predictive insights using data gathered from a number of sources.

For example, the cloud server 111 can provide users with insights into which tasks are most likely to complete and which tasks are at the highest risk of slipping, to enable the users to focus their resources on the right tasks. The cloud server 111 can provide the above-mentioned insights by analyzing all tasks over a predetermined period of time in the past, e.g., over the past two years, and use a model (e.g., hidden Markov model) and one or more AI classification algorithms to identify patterns and factors that drive those tasks that were successfully completed and those tasks that failed to complete.

The cloud server 111 can perform a number of additional functions using modules executing in the cloud server 1111. As shown in FIG. 1, the cloud server 111 can include a number of modules, for example, database management module 112, task management module 113, analytics module 117, user grouping and classifying module 121, task set creation module 123, and task completion estimating module 125. Each of the modules can execute on a separate hardware server, a separate virtual machine, or a separate software application server instance. Alternatively, the modules can execute on the same hardware server, the virtual machine or the software application server instance. The modules are provided for illustration purposes. Additional modules and additional functionality for each module can be added without limitation.

In an embodiment, database management module 112 provides task management to clients 101-102 based on task data provided by the task database system 105 as a data source. The database management module 112 can provide one or more services that can be used to initiate or schedule processing threads to synchronize data between activity database system 106 and the task database system 105. Database management module 112 can retrieve activity data from the activity database server 106, perform an analysis on the activity data, and update task data of the task database system 105 based on the analysis of the activity data.

In an embodiment, the synchronization between the task database system 105 and the activity database server 106 can be performed automatically and periodically using multiple processing threads. Through a first processing thread executed by a processor, the database management module 112 can access the activity database server 106 via an application programming interface (API) over a network, to retrieve a list of event objects that are associated with a number of activities in the activity database 106.

In an embodiment, through a second processing thread, the database management module 112 can determine one or more participant identifiers (IDs) from each of the event objects. The participant IDs identify one or more participants in an event or activity associated with the event object. An event or activity can be a meeting, an email, a phone log, a presentation, a signing of a contract or anything scheduled or completed to facilitate the closing of a deal.

The database management module 112 can extract a domain ID from each participant ID. Alternatively, the database management module 112 can obtain the domain ID for each participant by searching a data structure or database, or through a third party such as domain registry server 107. The database management module 112 can identify one or more entity objects based on the domain ID, where the entity objects are stored in the task database server 106.

In an embodiment, at least one attribute of at least one of the entity objects is modified based on the participant ID and the domain ID. The modification can generate at least one modified entity object. The database management module 112 can use a third processing thread to transmit one or more modified event objects to the task database server 105 via a second API over the network. The first processing thread, the second processing thread, and the third processing thread can be executed independently.

In one embodiment, in modifying the at least one attribute of the at least one entity object, the database management module 112 can determine whether there are multiple entity objects associated with the same domain ID. If there are, the database management module 112 can select a first entity object from the multiple entity objects based on a set of rules, and modify one or more attributes of the selected entity object based on the participant ID and the domain ID.

In a particular embodiment, if the database management module 112 determines that a participant ID matches a creator ID or owner ID corresponding to a creator or owner of any of the entity objects, the database management module 112 can select the first entity object for modification if the first entity object is the only entity object whose creator ID matches the participant ID. Otherwise, if the first entity object is not the only matching entity object, the database management module can designate the multiple entity objects as entity object candidates.

In addition, for each of the entity objects, the database management module 112 can determine whether one or more task objects are associated with the entity object. Each task object is associated with a task to be completed within a predetermined period of time. For each of the task objects, the database management module 112 can determine whether a participant ID matches a user ID of any user of a user group associated with the task object. If so, at least one attribute of the task object is modified based on the participant ID.

Referring to FIG. 1, the task management module 113 can be used to identify activities of a task associated with one of clients 101-102. The task database system 105 can be queried to obtain a task associated with an entity (e.g., a user, a group of users, a client). A first list of one or more contacts (e.g., contact persons, referred to herein target contacts) associated with the task from the task database system can be identified. For each of the contacts in the first list, a domain name can be determined based on contact information of the contact (e.g., emails, Web addresses, name of an account associated with the contacts). A first set of email addresses, referred to as target email addresses, can be determined based on the domain name and contacts using a set of activity identification rules. The activity database server 106 can subsequently be queried to retrieve a list of one or more activities such as emails and/or calendar events, based on the first set of email addresses.

Analytics module 117 can include a forecast engine used to predict completion of tasks that are scheduled to be completed within a particular time period. The prediction can be based on historical task completion data of one or more past time periods and can be made using machine learning techniques. The forecast engine can first compute historical completion rates of the tasks performed during a past time period (e.g., end of quarter to the same relative day as the current date in the quarter) using a number of relevant attributes of the tasks. The forecast engine intelligently smoothens and selects the completion rates to be applied to the current time period, such that the projection is more accurate.

In one embodiment, a request can be received from a client for determining a task completion rate of a first set of tasks associated with a set of attributes. The first set of tasks has been scheduled to be performed during a first time period (e.g., a current time period). In response to the request, for each of the attributes, a completion rate of one or more of a second set of tasks corresponding to the attribute is calculated. The second set of tasks has been performed during a second time period in the past. The completion rate represents a percentage of the second set of tasks that have been completed during the second time period. An isotonic regression operation can be performed on the completion rates associated with the attributes of the second set of tasks to calibrate the completion rates. The completion rates for the attributes of the first set of tasks can be predicted based on the calibrated completion rates of the second set of tasks.

In an embodiment, user grouping and classifying module 121 can provide visibility into a task process by tracking user activities, which enables an administrator to gauge prospect engagement based on the user activities. The module can determine contacts of individual tasks, and use the contacts and their email domains to identify email interactions of a user with the contacts, and meetings between the user and the contacts. In an embodiment, the meetings can be in the past or scheduled to be held in a predetermined future time period. User grouping and classifying module 121 then computes scores for each of the users based on their activities and group and classify, or rank the users based on their scores. The scores can be used to assess performance of users, and identify users that need additional training and coaching in communicating with outside parties or client engagement.

Task set creation module 123 can be used to construct a proposed task set (e.g., a pipeline) needed at the beginning of a future time period, in order to hit a quota for the end of the future time period. The module can analyze patterns of open tasks at the beginning of past quarters, and can predict the composition of the proposed pipeline needed to hit the quota based on historical data.

Task completion estimating module 125 can be used to estimate the time a user has spent so far in a task and the time that will be required of the user to complete the task. The module considers the time that the user has spent on digital interactions associated with the task, including but not limited to emails, calendar and call log activity. The digital interactions can be compared to digital interactions of past tasks that are in a similar stage.

User Activity Data Retrieval

Figure 2A:
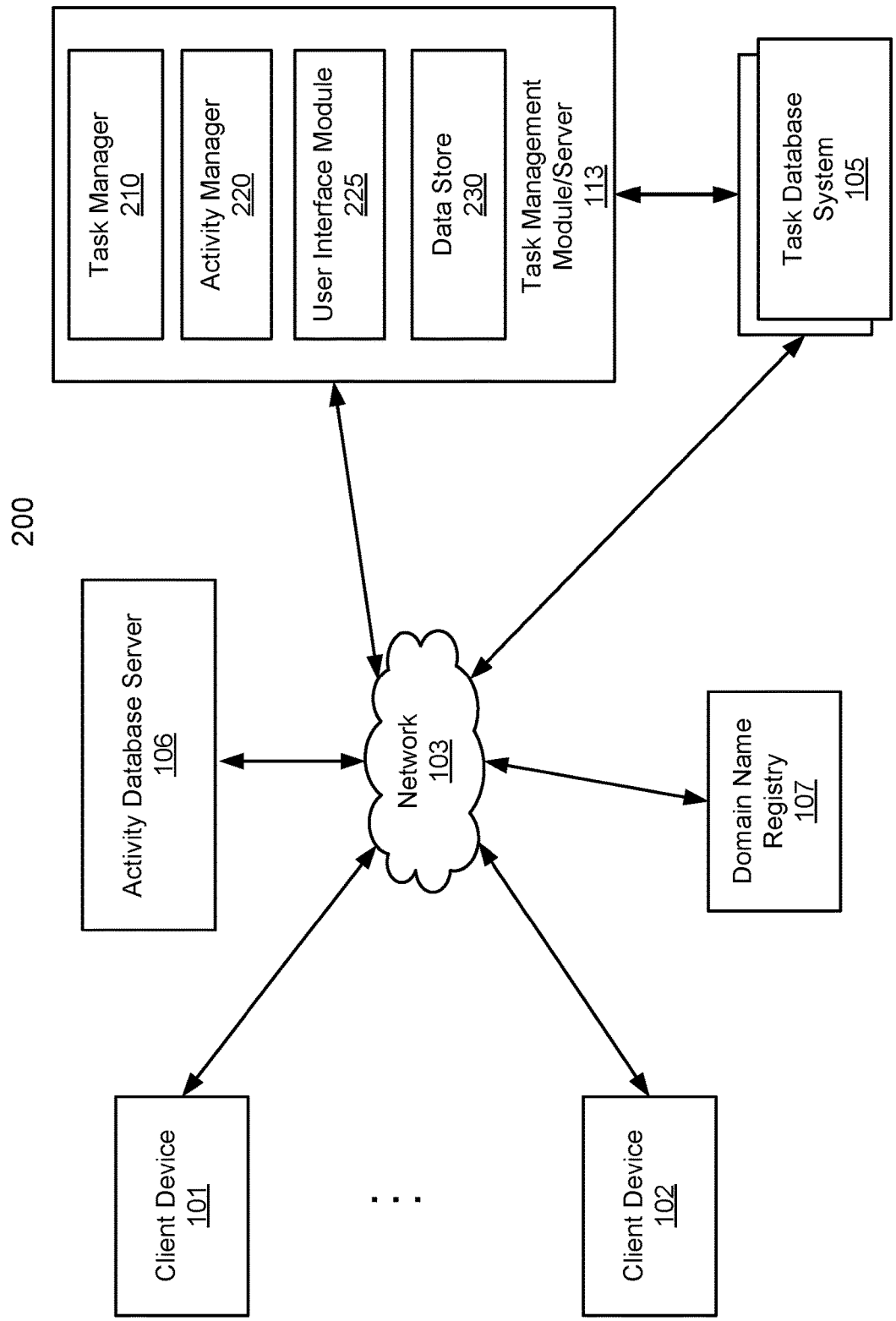
FIGS. 2A-2B illustrate the task management module 113 described in FIG. 1, in accordance with an embodiment of the invention.

FIG. 2A illustrates the task management module 113 described in FIG. 1, in accordance with an embodiment of the invention. In an embodiment, the task management module/server 113 in system 200 can provides task management and/or data analytics services to clients 101-102 by utilizing data and services provided by the task database system 105 as a data source. Although there is only one task database system shown in FIG. 2A, multiple task database systems can be used to support the task management server/module 113, which can be implemented as a multi-tenancy system.

In an embodiment, the multi-tenancy system can access multiple task database systems concurrently over network 103. For example, a user of client device 101 may be associated with a first organization as a first corporate client to the task management server/module 113, while a user of client device 102 may be associated with a second organization as a second corporate client to the task management server/module 113. The first and second organizations may employ different instances of the multiple task database systems.

In one embodiment, the task management server/module 113 includes, but is not limited to, a task manager 210, activity manager 220, user interface module 225, and data store 230. The task manager 210 is configured to interact with the task database system 105 to access and manage tasks hosted by the task database system 105. Activity manager 220 is configured to determine any activities associated with a particular task, such as emails and calendar events (e.g., meetings). The user interface module 225 provides a user interface, which can be any kind of user interface (e.g., Web, graphical user interface or GUI, or command line interface or CLI) that allows users of client devices 101-102 to access services provided by the task management server/module 113.

In one embodiment, the services can include automatically identifying activities associated with a task. The identified activities can be presented by the user interface module 225 on a graphical user interface (GUI) at a client that accesses the task management system 113.

Data store 230 stores or caches data of a variety of tasks. The data may be periodically updated from a number of corresponding data source(s) or data provider(s). The task manager 210 and/or activity manager 220 may directly access the task database system 105 to query and retrieve the data. Data stored in the data store 230 can be maintained in a variety of data structures, such as tables or databases. The task manager 210 and/or activity manager 220 can access data store 230 via a variety of application programming interfaces (APIs), database queries, or other suitable communication protocols (e.g., structured query language or SQL).

According to one embodiment, activity manager 220 is configured to identify activities of a task associated with a client by invoking the task manager 210, which communicates with the task database system 105 to determine target email addresses of the client, e.g., a prospect or customer. The activity manager 220 also determines source email addresses of users associated with the task. For the source email addresses and target email addresses, the activity manager 220 can automatically query the activity database server 106 to determine activities, such as email, meeting, and phone logs associated with the task. The activity manager 220 can automatically populate these activities accurately as soon as activities are discovered, for example, when meetings have been scheduled, emails have been exchanged at the activity database server 106, and/or phone calls have been logged.

Figure 2B:
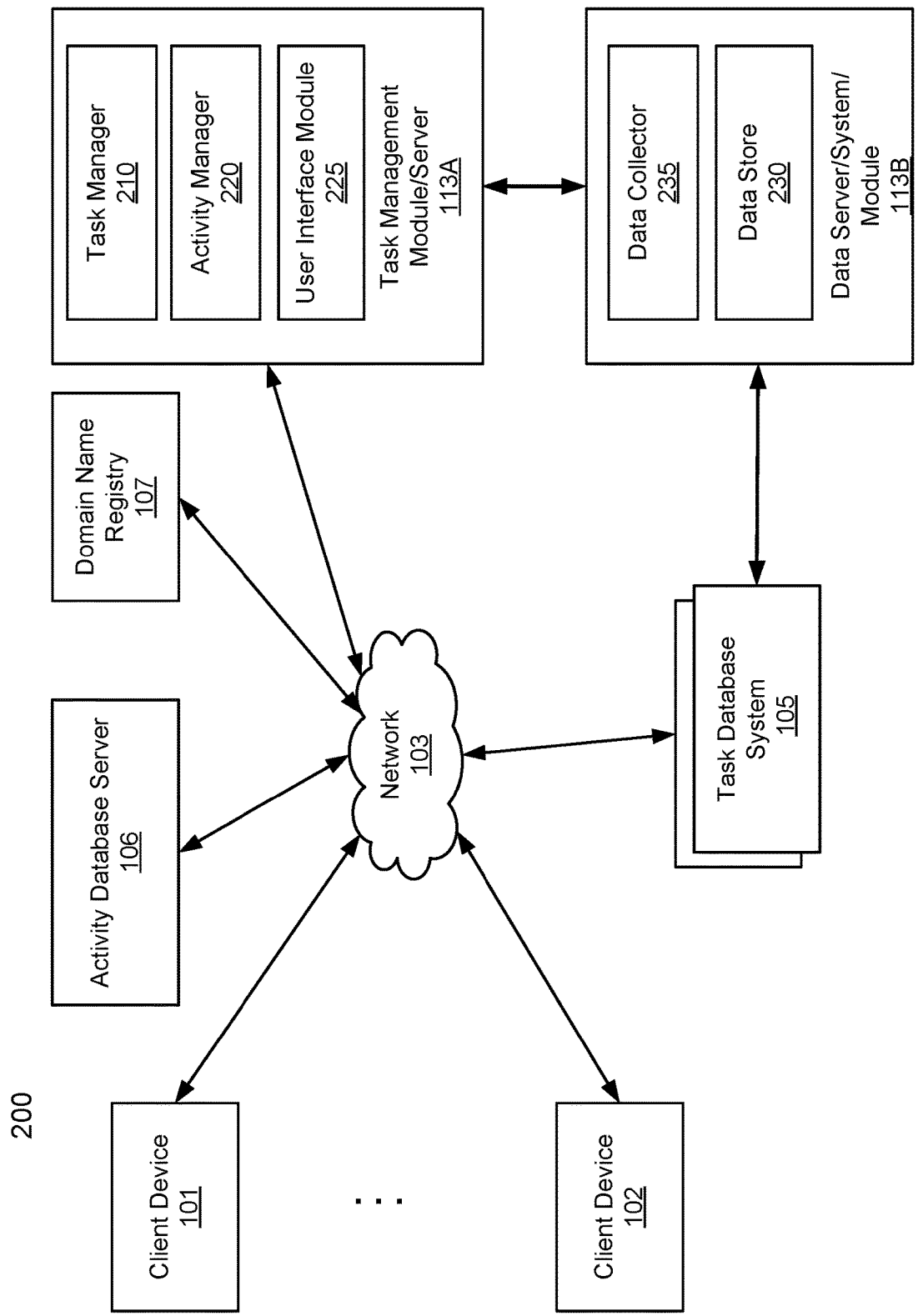

Although in this embodiment, data store 230 is maintained by the task management system 113, data store 230 can be maintained in a dedicated data server that is a separate server from the task management server/module 113 as shown in FIG. 2B.

Referring now to FIG. 2B, in this embodiment, task management server 113A and data server 113B are implemented as separate servers, which may be operated by the same or different organizations or entities. Data store 230 in this embodiment is maintained by data server 113B, which further includes data collector 235 that is configured to periodically or constantly collect or update data from the task database system 105. The task management server 113A communicates with data server 113B using a variety of communication protocols to access task data stored in data store 230.

Figure 3:
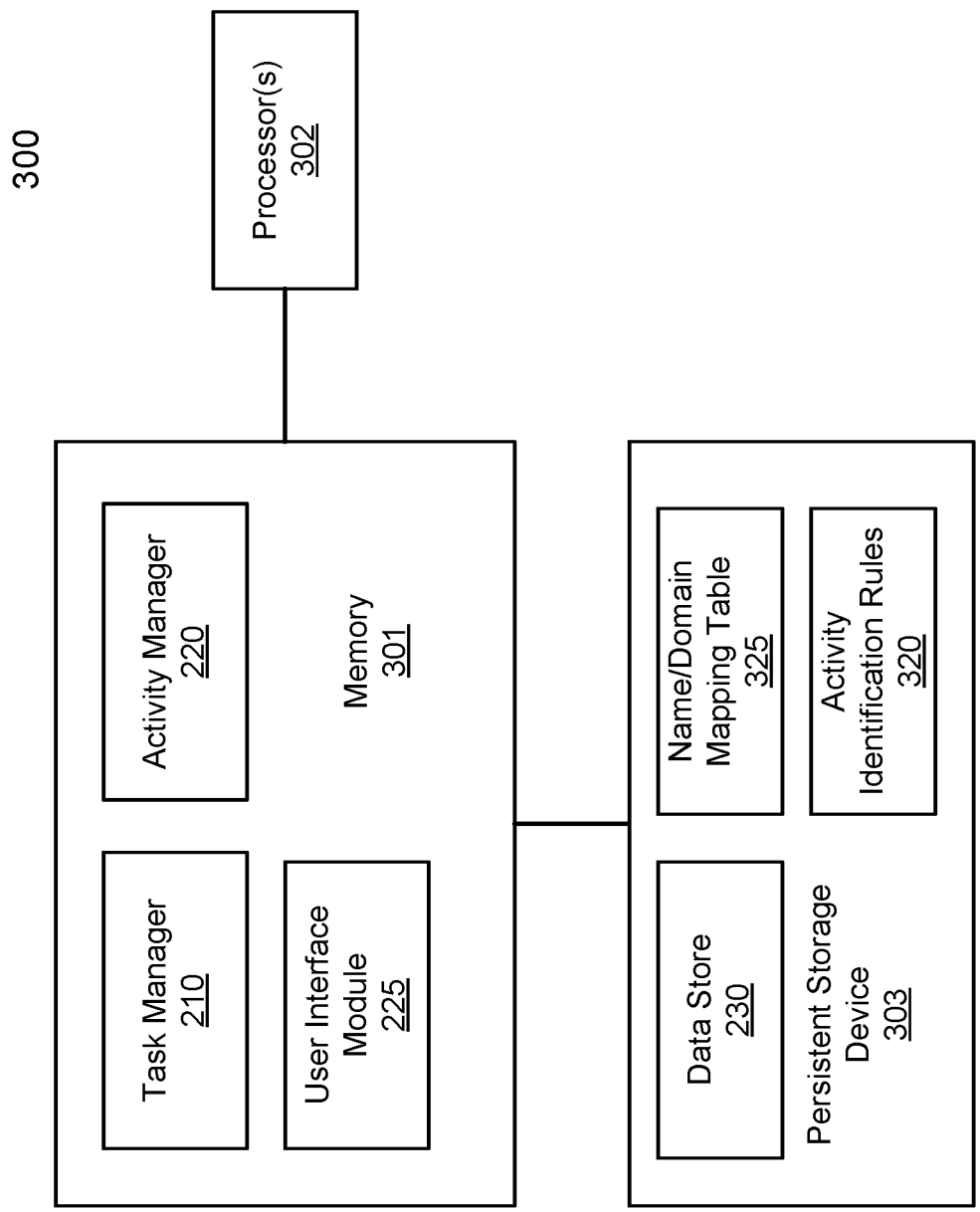
FIG. 3 is a block diagram illustrating an example of a task management system according to one embodiment of the invention.

FIG. 3 is a block diagram illustrating an example of a task management system according to one embodiment of the invention. System 300 may be implemented as part of a task management system or server 113. Referring to FIG. 3, system 300 includes a task manager 210, an activity manager 220, and a user interface module 225 loaded in memory 301 (e.g., volatile memory such as random access memory or RAM) and executed by one or more processors 302 (e.g., microprocessors, central processing units or CPUs). Data store 230 is maintained in persistent storage device 303, such as a hard disk, which may be maintained locally or remotely over a network. At least a portion of data stored in data store 230 may be cached in memory 301.

Referring now to FIGS. 2A-2B and 3, according to one aspect of the invention, the task manager 210 queries the task database system 105 to obtain a list of tasks that are associated with a particular entity (e.g., a user, a group of users, a client or customer). The task database system 105 can be associated with or utilized by an Enterprise client that a user works with as a customer representative or sales representative.

For example, a team manager of a sales team having one or more team members can log into the task management system 300, and in response to the login, the task manager 210 can communicate with the task database system 105 to retrieve a list of tasks that the one or more team members are to work on.

In one embodiment, when the task manager 210 queries the task database system 105, the task manager 210 can send a query request to the task database system 105. The query request can include a number of parameters that specify one or more attributes of the tasks to be queried and retrieved. In response to the query request, the task database system 105 operates to return the list of tasks that match the parameters specified in the query.

For example, the task manager 210 can query the task database system 105 by specifying that only account contacts of a particular account should be retrieved or only contacts of a particular task should be retrieved. Alternatively, the task manager 210 may perform filtering of accounts and/or tasks to identify the tasks.

Figure 4:
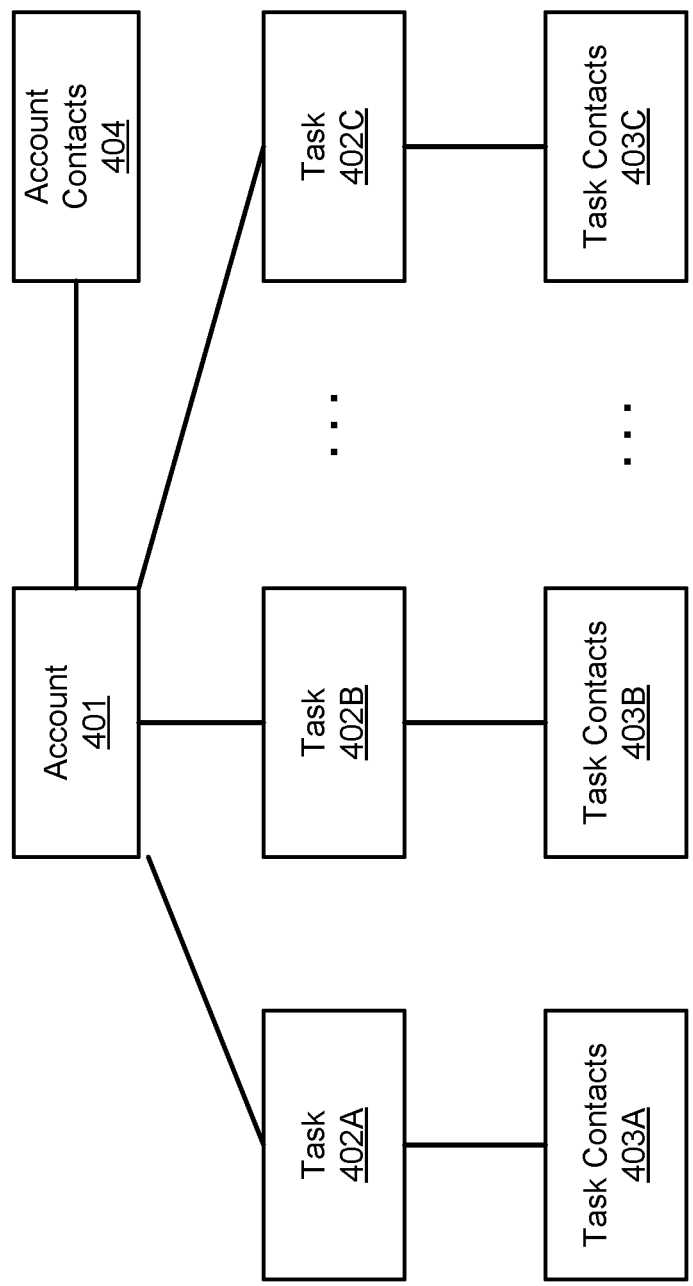
FIG. 4 illustrates an exemplary account in accordance with an embodiment of the invention.

FIG. 4 illustrates an exemplary account in accordance with an embodiment of the invention. As shown in FIG. 4, account 401 may be associated with one or more tasks 402A-402C. For example, account 401 may belong to a client or customer that has potential tasks 402A-402C that are being concurrently processed. Account 401 may be managed by one or more persons at an account level, referred to as account contacts 404. Each of the tasks 402A-402C may be managed by one or more persons at a task level, referred to herein as tasks contacts, such as task contacts 403A-403C. Different people may be associated with account contacts 404 and task contacts 403A-403C. Alternatively, a single person can be a part of both account contacts 404 and any one or more of task contacts 403A-403C. Each of account contacts 404 and task contacts 403A-403C may include one or more email addresses of the contact (e.g., a source email address and/or a target email address) and/or a Web site associated with the account or task. These contact information may be stored in the task database system 105 and can be accessible via queries.

For each of the tasks (e.g., tasks 402A-402C of FIG. 4), referring back to FIGS. 2A-2B and 3, the task manager 210 can query the task database system 105 to obtain a first list of one or more contacts associated with the task, which can be a target contact or a source contact. A target contact refers to a person of a client or customer as a point of contact for a particular task. A source contact refers to a person that is responsible for the task within a sales organization. An example source contact is a sales representative that works on a task. For the contacts in the first list, activity manager 220 can determine a domain name based on contact information of the contacts (e.g., emails, Web addresses, name of an account associated with the contacts). A first set of email addresses, referred to as target email addresses, are determined based on the domain name and contacts using a set of activity identification rules 320. A target email address refers to an email address associated with a target contact. An email server is queried to retrieve a list of one or more emails and/or calendar events based on the first set of email addresses.

In one embodiment, if the contact information of a task includes the email addresses of the contacts, the email addresses may be directly used in identifying the activities. The domain name can be extracted from the email addresses, and used to identify other email addresses of the contacts. However, in some situation, the contact information stored in the task database system may not include an email address of the contact. In such a scenario, the domain name can be derived from other information (e.g., name, notes, Web address, phone number, social network such as Facebook®, Twitter®, LinkedIn®, etc.) associated with the contact.

The activity identification rules 320 may specify a preference or priority order indicating which of the contact information should be used in order to identify a domain name. For example, activity identification rules 320 may specify that a task contact should be used to determine a domain name over the account contact, and that the account contact will be used only if the task contact is unavailable.

In an embodiment, the activity identification rules 320 may be different for different clients, different accounts, and/or different tasks; and can include a first set of rules for identifying source email addresses and a second set of rules for identifying target email addresses. Further, the email identifying rules 320 may be configurable by an administrator via a configuration interface such as a CLI or Web interface.

In one embodiment, in determining a domain name associated with a client, an account, or a task, the activity manager 220 can determine whether there is any task contact associated with the task. If there is a task contact associated with the task, the activity manager 220 can determine the domain name based on the task contact of the task. A task contact refers to a person of a client who specifically handles a particular task. The domain name may be derived from any contact information (e.g., name, notes, Web address, phone number, social network such as Facebook®, Twitter®, LinkedIn®, etc.) associated with the task contact. If there is no task contact associated with the task, the activity manager 220 determines the domain name based on an account contact associated with an account to which the task belongs. The domain name may be obtained from an email address or other information of the account contact. In this example, activity identification rules 320 associated with this task may specify that a task contact should be utilized over an account contact in determining a domain name.

According to another embodiment, if there is no account contact associated with the account of the task, dependent upon activity identification rules 320, the activity manager 220 may determine the domain name based on a Web address of a Web site associated with the account. The Web address may also be obtained from the task database system 105 as a part of account contact information of the account associated with the task.

According to one embodiment, if there is no Web address obtained from the task database system 105, the activity manager 220 determines the domain name from a domain name registry, such as domain name registry 107, based on an account name of the account. Typically, if the account has been registered in the domain name registry (e.g., WHOIS™) the registered domain name is typically registered under a particular name. Based on the account name, a registered domain name may be obtained from domain name registry 107.

If there is no registered domain name based on the account name, the activity manager 220 utilizes a name-to-domain (name/domain) mapping table 325 to obtain the domain name based on the account name. In one embodiment, name/domain mapping table 325 includes a number of mapping entries, where each mapping entry maps a particular name to a domain name. Name/domain mapping table 325 may be maintained and updated over time to map a name to a domain name, especially when a name is not related to a domain name from its appearance.

The above process is to determine a domain name associated with a client (e.g., customer), an account, and/or a task. The domain name is then utilized to determine email addresses for the purpose of identifying activities of a task. Some of the above operations or the sequential order of the operations may be different dependent upon the specific situations, which may be specified as part of the activity identification rules associated with the client, the account, and the task.

According to another embodiment, in addition to obtaining the first set of email address as target email addresses, the activity manager 220 determines a second list of one or more contacts associated with the task via the task manager 210 from the task database system. The second list of contacts, referred to herein as source contacts, is associated with one or more team members of a sales team that work with one or more target contacts on the task. A source contact can be an owner of the task, a customer representative, and/or an account representative. A second set of email addresses associated with the contacts of the second list is determined by activity manager 220, where the email addresses of the second list are referred to as source email addresses. The email server, such as activity database server 106, is queried based on the source email addresses and the target email addresses to obtain a list emails and/or calendar events.

In one embodiment, only the emails or meetings that have been exchanged between the source email addresses and the target email addresses (e.g., senders and recipients) associated with the same task are identified. In some situations, a source contact may be handling multiple tasks of different accounts and/or different clients. Similarly, a target contact may handle multiple tasks of an account or multiple accounts. By matching the exact source email addresses and target email addresses, the truly relevant emails between the source contact(s) and target contact(s) of the same task may be identified.

In one embodiment, if some emails exchanged are prior to the creation of the task, such emails can be removed from the list because they are unlikely related to the task. Similarly, if certain calendar events were concluded or completed prior to the creation of the task, such calendar events may be removed. In addition, some of the contacts may be related to a broker or a product reseller or distributor, such contacts are not a part of the client or the sales team. Such contact information would not be utilized in determining the domain name for the purpose of identifying emails and calendar events of the task.

In one embodiment, if a particular contact is associated with more than a predetermined number of accounts (e.g., five accounts), such a contact is deemed to be a broker or reseller/distributor and is deemed not to be a proper target contact. Similarly, if some of the tasks have been closed, those tasks can be removed and the activities of the closed tasks would not be processed.

Estimating Required Time

Figure 5:
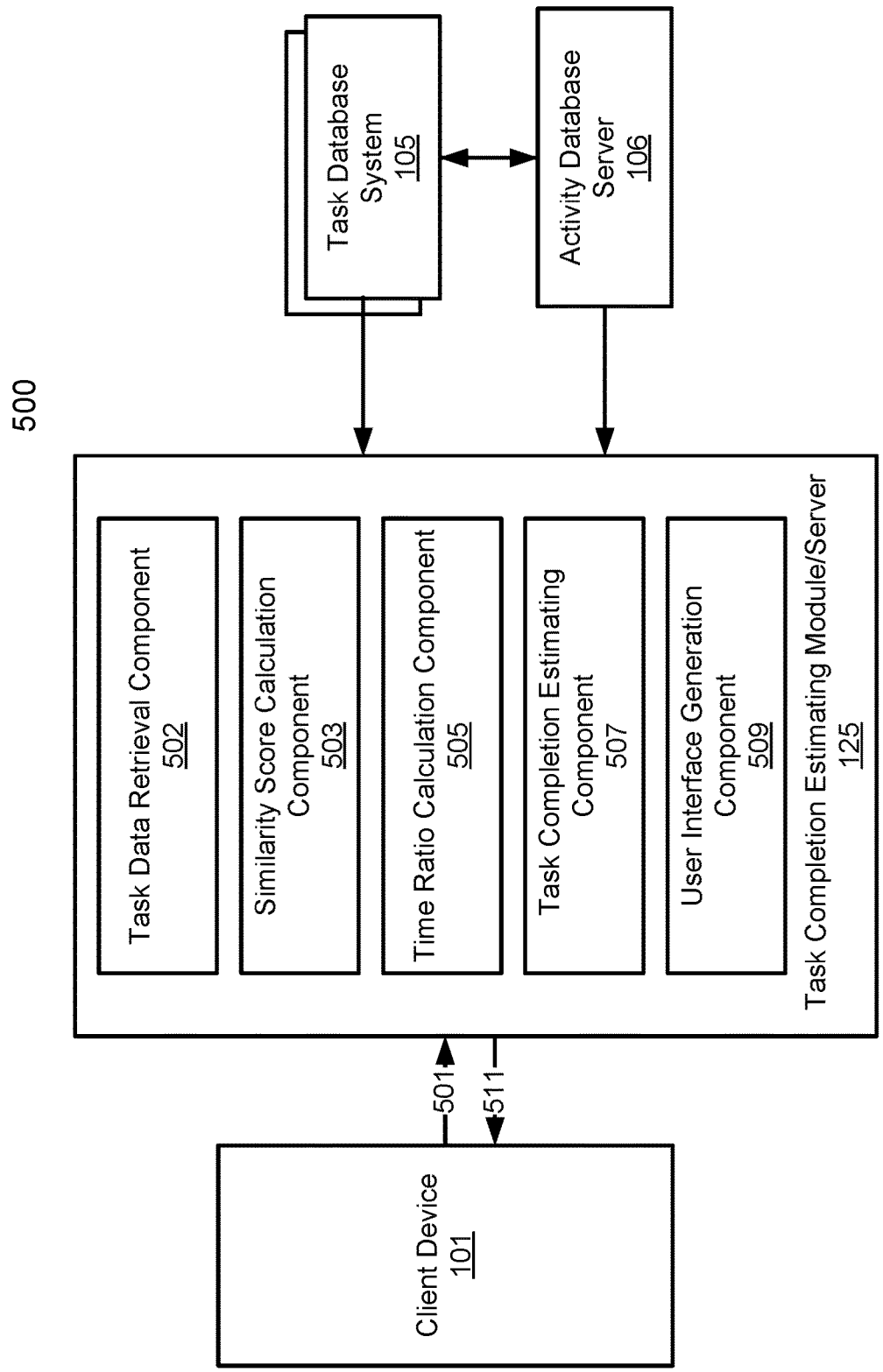
FIG. 5 illustrates a system for estimating time required to complete a task in accordance with an embodiment of the invention.

FIG. 5 illustrates a system for estimating time required to complete a task in accordance with an embodiment of the invention. As shown in FIG. 5, the task completion estimating module 125 can include a number of components 501-507, each of which can perform one or more functions in estimating time required to complete a task.

The task completion estimating module 125 can receive a request 501 from a client device 101, for estimating time required to complete a current task. The current task can be a task that is being worked on by a user (e.g., a sales representative), and can include a number of stages predetermined by a system administer. For example, the current task can be a deal/project in a customer relationship management (CRM) system.

A system administrator (e.g., a supervisor) in an organization can determine how many stages that a task must go through to be successfully completed. For example, the number of stages can include "prospecting", "appointment scheduled", "needs analysis", "presentation scheduled", "contract sent", and "closed won".

In response to receiving the request, task data retrieval component 502 can invoke an application programming interface (API) using a database query protocol to retrieve a number of completed tasks from the task database system 105 based on one or more query parameters, so that each retrieved task is similar to the current task in terms of at least one of a number of characteristics associated with a task.

For example, the characteristics associated with a task can include a task size, an account, a region, and a product mix. A task size can be measured by a value associated with a task. A task with a larger size typically requires more time to complete. An account can be an entity or a data structure as described in FIG. 4, and can be associated with one or more tasks that belong to an organization. A region can refer to an originating region of a task, for example, the region where the outside party resides. A product mix can refer to one or more types of products that a task is related to.

The above-described characteristics of a task can be used by similarity score calculation component 503 to determine how similar two tasks are to each other. The score calculation component 503 can use a predetermined algorithm to calculate a similarity score between each of the number of retrieved tasks and the current task. The predetermined algorithm can use a different weight for each characteristic when calculating the similarity score.

In an embodiment, time ratio calculation component 505 can determine a point in time that the current task has progressed to in the life cycle of the current task. The time ratio calculation component 505 can further determine an amount of time spent on the current task up to the determined point in time, an amount of time spent on each of the retrieved completed tasks up to a point in time corresponding to the determined point in time on the current task, and an amount of time spent on each retrieved completed after the corresponding point in time.

For each retrieved completed task, the time ratio calculation component 505 can compute a time ratio between the amount of time spent on the completed task after the corresponding point in time and the amount of time spent on the completed task before the corresponding point in time.

In an embodiment, when calculating time spent on a task, the time ratio calculation component 505 can use user activity data stored on the activity database server 106. The activity database server 106 can include but not limited to email accounts, calendar accounts and call logs of users associated with the retrieved completed tasks.

The time ratio calculation component 505 can determine the duration of a meeting based on the recorded duration in a calendar account, and determine the duration of a call based on the recorded duration in a call log. For emails sent and received, the time ratio calculation component 505 can provide an estimated amount of time for such emails based on the number of words in each email.

When providing the estimated time spent on an email sent, the time ratio calculation component 505 uses a configurable parameter with a value indicating an amount of time that an average user takes in writing a certain number of words. Similarly, when estimating time spent on an email received, the time ratio calculation component 505 can use a configurable parameter with a value indicating time that an average user takes in reading a certain number of words.

In an embodiment, one or more additional types of interactions between a user and one or more outside parties may be used to compute time spent on a particular task. The time ratio calculation component 505 can calculate time spent on the additional types of interactions using either recorded time durations or indirect estimation, as described above, depending the type of each interaction.

With the above-described approach to calculating an amount of time spent on an individual meeting, call or email, an amount of time spent on each completed task before or after a point in time corresponding to the identified point in time in the current task can be calculated. Similarly, the amount of time spent on the current task up to the determined point in time can be computed.

In an embodiment, with the similarity scores and the time ratios for each completed task, the task completion estimating component 507 can calculate a weighted arithmetic mean (M) of the time ratios using the similarity scores as weights, and the amount of time spent on the current task up to the determined point in time ($T_1$). Next, the task completion estimating component 507 can compute an amount of time required to complete the current task (T) using the following formula: $T=T_1*M$. User interface generation component 509 can generate a graphical user interface in the client device 101, and displays the required time to complete the current task in the graphical user interface.

Figure 6:
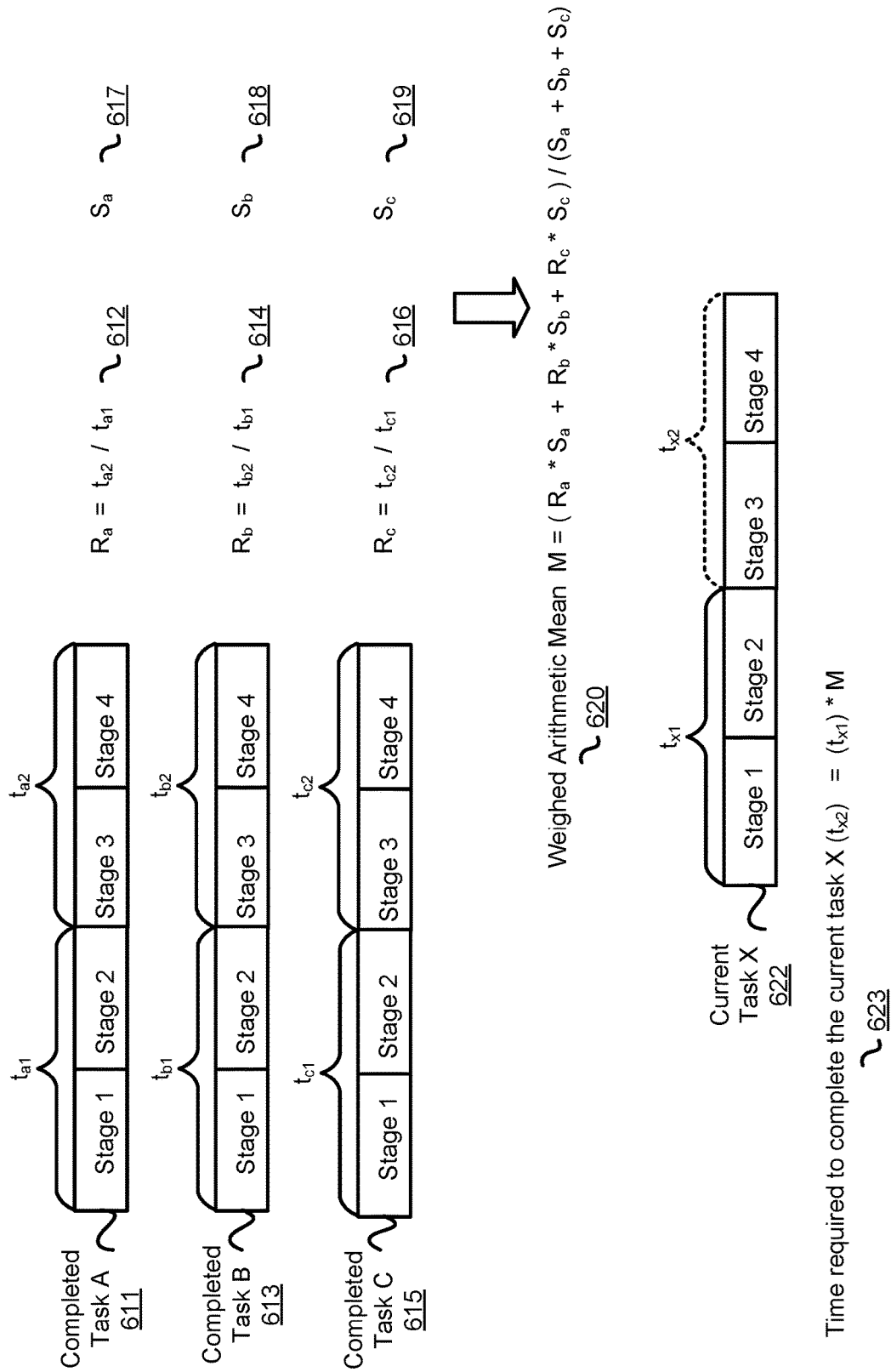
FIG. 6 illustrates an example of calculating an amount of time required to complete a task in accordance with embodiment of the invention.

FIG. 6 illustrates an example of calculating an amount of time required to complete a task in accordance with embodiment of the invention. As shown in FIG. 6, the cloud server 111 can determine a point in time that current task X 622 has progressed to. In this example, the current task X 622 has just completed stage 2. The cloud server 111 can further determine that an amount of time ($t_{x1}$) has been spent on current task X 622 using activity data retrieved from the activity database server 106.

The cloud server 111 can retrieve a number of completed tasks, for example, completed task A 611, completed task B 613, and completed task C 615, from the task database system 105. Each completed task includes the same set of stages as the current task X 622. The cloud server 111 can identify in each completed task a point in time corresponding to the point in time that the current task X has progressed to, and calculate a first amount of time ($t_{a1}$, $t_{b1}$, and $t_{c1}$) spent on the completed task before the identified point in time and a second amount of time ($t_{a2}$, $t_{b2}$, and $t_{c2}$) spent on the completed task after the identified point in time.

In an embodiment, a time ratio ($R_a$ 612, $R_b$ 614 and $R_c$ 616) and a similarity score ($S_a$ 617, $R_b$ 618 and $R_c$ 619) for each completed task can be computed. The time ratio from each completed task is calculated by dividing the first amount of time by the second amount of time spent on the completed task. The similarity score for each completed task is a value indicating how similar the completed task is to the current task 622, and can be calculated using a predetermined algorithm based on a number of parameters, for example, task size, and task originating region, etc.

The cloud server 111 can calculate a weighted arithmetic mean (M) 620 of the time ratios. With the an amount of time ($t_{x1}$) that has been spent on current task X 622 and the weighted arithmetic mean of the time ratios for the completed tasks, the cloud server 111 can calculate the time required to complete the current task X (($t_{x1}$) 623 using the formula: $t_{x2}=(t_{x1})*M$.

Figure 7:
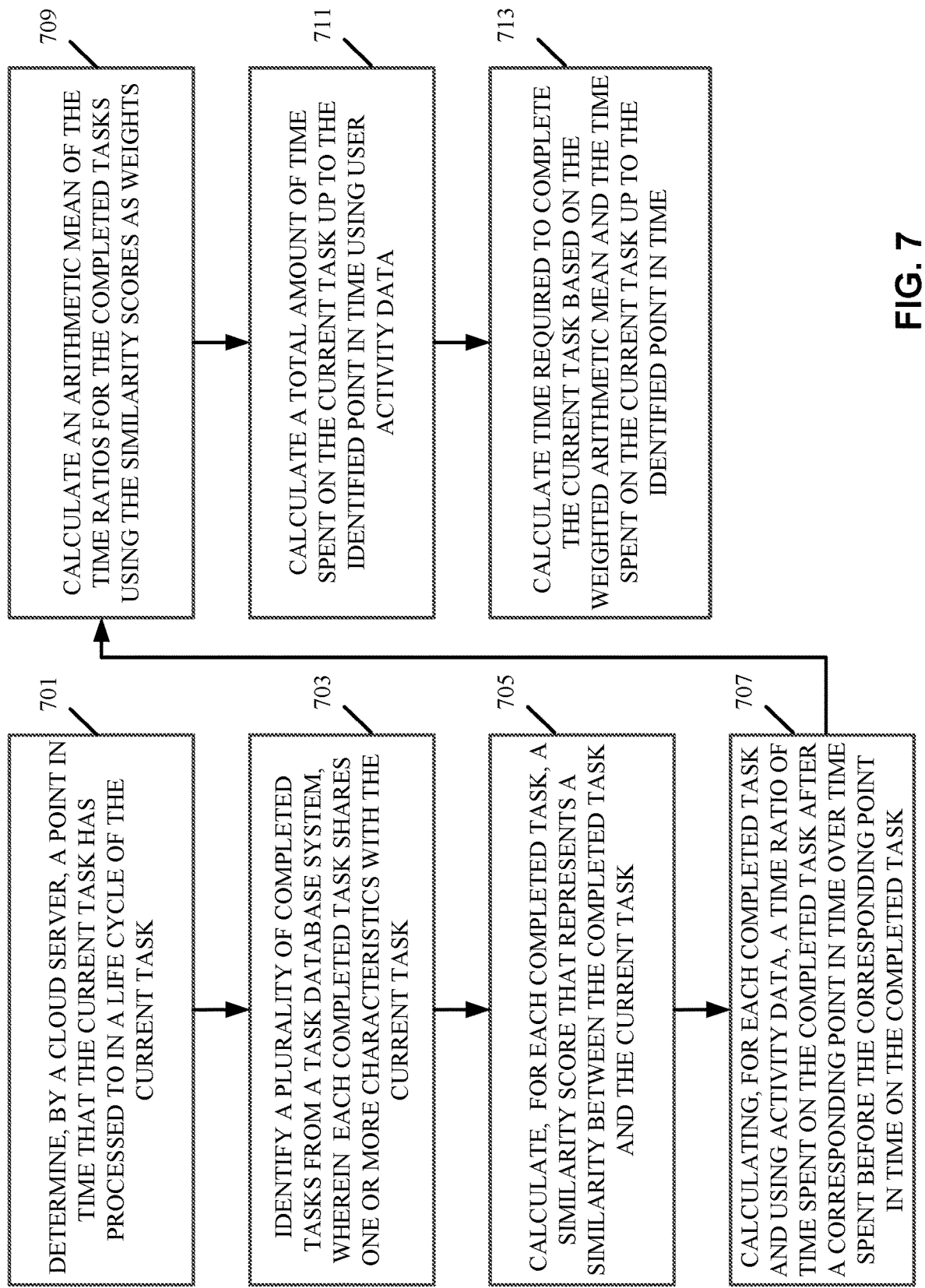
FIG. 7 illustrates a process for calculating an amount of time required to complete a task in accordance with embodiment of the invention.

FIG. 7 illustrates a process for calculating an amount of time required to complete a task in accordance with embodiment of the invention. As shown in FIG. 7, the process may be performed by process logic that includes software, hardware, or a combination thereof. For example, the process may be performed by the task completion estimating module 125 and one or more other modules in the cloud server 111.

Referring to FIG. 7, in operation 701, a cloud server having a memory and a processor over a network determines a point in time that a current task has progressed to in a life cycle of the current task, wherein the cloud server is communicatively coupled to a task database system and an activity database server. In operation 703, the cloud server identifies a number of completed tasks from the task database system and each completed tasks shares one or more characteristics with the current task. In operation 705, the cloud server calculates, for each completed task, a similarity score representing a similarity between the completed task and the current task using a predetermined algorithm. In operation 707, the cloud server calculates, for each completed task, a time ratio of a first amount of time over a second amount of time, the second amount of time representing an amount of time spent on the completed task up to a point in time corresponding to the determined point in time in the current task, and the first amount of time representing an amount of remaining time spent on the completed task. Each of the first amount of time and the second amount of time is calculated based on user activity data retrieved by the cloud server from the activity database server. In operation 709, the cloud server calculates a weighted arithmetic mean of the time ratios for the completed tasks using the similarly scores as weights. In operation 711, the cloud server calculates a total amount of time spent on the current task up to the determined point in time using data from the activity database server. In operation 713, the cloud server calculates the amount of time required to complete the current task by multiplying the weighted arithmetic mean and the total amount time spent on the current task up to the determined point in time.

Figure 8:
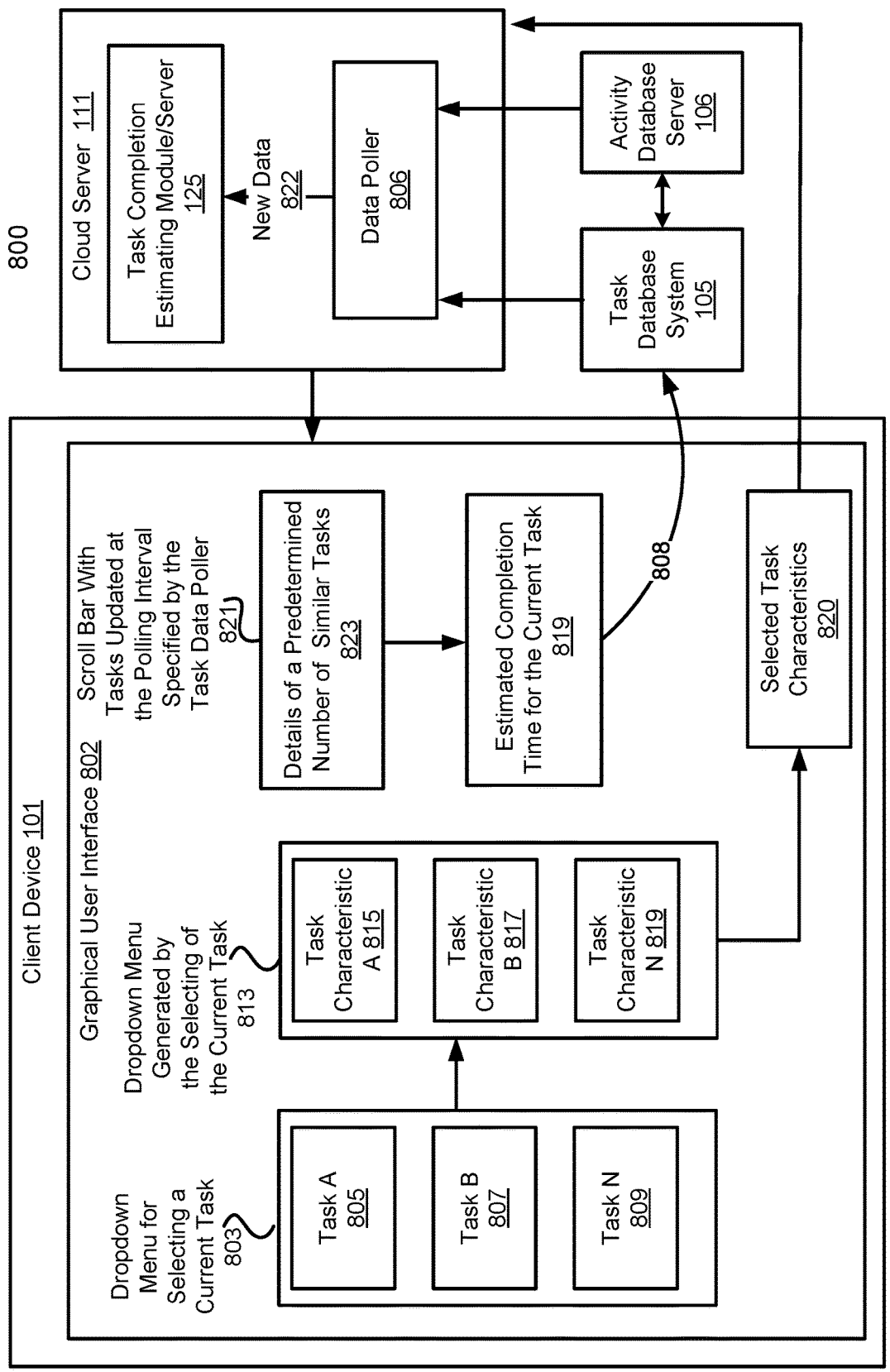
FIG. 8 illustrates an example user interface in accordance with an embodiment of the invention.

FIG. 8 illustrates an example user interface in accordance with an embodiment of the invention. As shown in FIG. 8, a graphical user interface 802 can be generated by the cloud server 11 and displayed in the client device 101. The graphical user interface 802 can include a dropdown menu 803 for a user to select a task from tasks 805, 807 and 809 displayed in the dropdown menu 803. In an embodiment, the tasks 805, 807 and 809 can be retrieved by the cloud server from the task database system 105 based on one or more user-defined criteria, including a task value and/or a task stage. For example, each of the tasks 805, 807 and 809 can be a task with a task value with a particular pre-defined range.

The graphical user interface further includes a dropdown menu 813, which can be generated by the cloud server 111 based a particular task selected from the dropdown menu 803. The dropdown menu 813 is to display task characteristics 815, 817 and 819 of the selected task from the dropdown menu 803. In an embodiment, the user can select one or more of the task characteristics 815, 817 and 819. Upon the selection, the cloud server can be invoked to send the selected task characteristics 820 to the cloud server.

In an embodiment, the cloud server 111 can include a data poller 806, which is configured to poll the task database system 105 and the activity database server 106 at a fixed interval (e.g., every 3 hours) for any new data 822, including newly completed tasks and new user activity data. The new data 822 and the selected task characteristics 820 can be used by the task completion estimating module 125 to generate a predetermined number of tasks similar to the selected task from the dropdown menu 803, and display details of the predetermined number of tasks 823 in a scroll bar 821.

The task completion estimating module 125 can estimate an amount of time 819 required to complete the selected task in accordance with the process described in FIG. 7. As the data poller 806 keeps polling new data from the task database system 105 at a configurable fixed interval, the task completion estimating module 125 can update the predetermined number of similar tasks at the same interval, which further causes the estimated amount of time required to complete the selected task to be updated in real-time.

In an embodiment, the task completion estimating module 125 can further alerts the user whenever the amount of time 819 exceeds or is below a predetermined threshold, so that the user may considering reassigning the task to another user who is more appropriate to work on the selected task. Whenever the estimated amount time to complete the selected task is updated, the cloud server 111 can be invoked to update the selected task in the task database system 105 with the updated information; if the selected does not exist in the task database system 105, the cloud server 111 can persist 808 the selected task to the database system 105. The selected task with the updated information in the task database system 105 can be considered new data, and the estimated amount time to complete the selected would be treated as an actual time to complete the selected task.

As such, the graphical user interface 802 described in FIG. 8 can operates a real-time monitoring and visualization interface, where tasks similar to the selected task and the amount time estimated to complete the selected time are both constantly changing, as new data entered into the task database system 105 are constantly polled by the cloud server for use in generating the similar task list.

Figure 9:
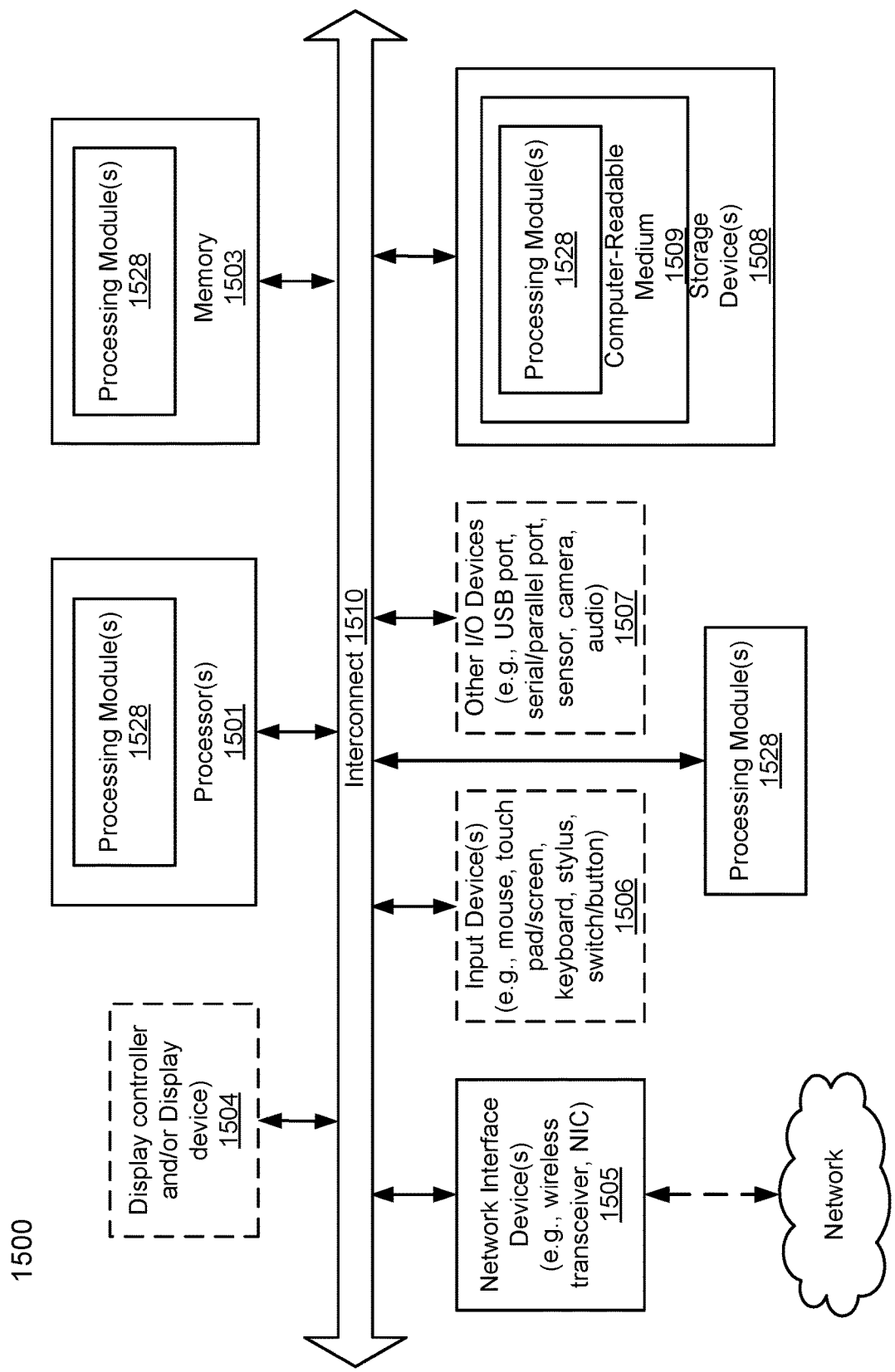
FIG. 9 is a block diagram illustrating an example of a data processing system which may be used with one or more embodiments of the invention.

FIG. 9 is a block diagram illustrating an example of a data processing system which may be used with one or more embodiments of the invention. For example, system 1500 may represent any of data processing systems described above performing any of the processes of methods described above, such as, for example, client devices 101-102 and servers 105-107 and 111 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, task manager 110, activity manager 120, and/or data synchronization module 212 of FIGS. 1A-1B and 2, as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for estimating an amount of time spent on a current task and an amount of time required to complete the current task, the method comprising:

determining, by a server communicatively coupled to a task database system and an activity database system, a stage that the current task has progressed to in a life cycle of the current task, wherein the life cycle of the current task includes a fixed number of predetermined stages;

invoking an application programming interface (API) using a database query protocol to identify a plurality of completed tasks from the task database system, wherein each of the plurality of completed tasks shares, with the current task, one or more characteristics from a set of characteristics associated with the current task;

for each of the plurality of completed tasks,
calculating a similarity score representing a similarity between the completed task and the current task using a predetermined algorithm that utilizes a different weight for each of the set of characteristics associated with the current task, and
calculating a time ratio of a first amount of time over a second amount of time, wherein the first amount of time represents time spent on the completed task after a stage corresponding to the determined stage on the current task, wherein the second amount of time represents time spent on the completed task before the corresponding stage, and wherein each of the first amount of time and the second amount of time is calculated based on user activity data retrieved by the server from the activity database system, wherein the user activity data includes activity data associated with a plurality of users when performing the plurality of completed tasks;

calculating a total amount of time spent on the current task up to the determined stage using data from the activity database system; and calculating the amount of time required to complete the current task based on the similarity score, the time ratio, and the total amount time spent on the current task up to the determined stage.

2. The method of claim 1, wherein the time required to complete the current task is calculated as a product of the total amount time spent on the current task up to the determined stage and an arithmetic mean determined based on the time ratios and the similarity score.

3. The method of claim 2, wherein the arithmetic mean is a weighted arithmetic mean of the time ratios using the similarity scores as weights.

4. The method of claim 1, wherein the user activity data include emails sent or received, phone calls, and meetings.

5. The method of claim 4, wherein the first amount of time, the second amount of time, and the total amount of time spent on the current task up to the determined stage are calculated using at least one of a duration of each phone call, a duration of each meeting, or an estimated duration of time spent on each email sent or received.

6. The method of claim 5, wherein the duration of time spent on each email sent is estimated based on a predetermined time writing a predetermined number of words.

7. The method of claim 5, wherein the duration of time spent on each email received is estimated based on a predetermined time reading a predetermined number of words.

8. The method of claim 1, wherein the one or more characteristics shared between the current task and each of the plurality of completed tasks include one or more of a task value, a task originating region, or a task product mix.

9. The method of claim 1, wherein the current task and each of the plurality of completed tasks include a same set of predetermined stages.

10. A non-transitory machine-readable medium having instructions stored therein, which when executed by a processor, cause the processor to perform operations for estimating an amount of time spent on a current task and an amount of time required to complete the current task, the operations comprising:
  determining, by a server communicatively coupled to a task database system and an activity database system, a stage that the current task has progressed to in a life cycle of the current task, wherein the life cycle of the current task includes a fixed number of predetermined stages;
  invoking an application programming interface (API) using a database query protocol to identify a plurality of completed tasks from the task database system, wherein each of the plurality of completed tasks shares, with the current task, one or more characteristics from a set of characteristics associated with the current task;
  for each of the plurality of completed tasks,
    calculating a similarity score representing a similarity between the completed task and the current task using a predetermined algorithm that utilizes a different weight for each of the set of characteristics associated with the current task, and
    calculating a time ratio of a first amount of time over a second amount of time, wherein the first amount of time represents time spent on the completed task after a stage corresponding to the determined stage on the current task, wherein the second amount of time represents time spent on the completed task before the corresponding stage, and wherein each of the first amount of time and the second amount of time is calculated based on user activity data retrieved by the server from the activity database system, wherein the user activity data includes activity data associated with a plurality of users when performing the plurality of completed tasks;
  calculating a total amount of time spent on the current task up to the determined stage using data from the activity database system; and
  calculating the amount of time required to complete the current task based on the similarity score, the time ratio, and the total amount time spent on the current task up to the determined stage.

11. The machine-readable medium of claim 10, wherein the time required to complete the current task is calculated as a product of the total amount time spent on the current task up to the determined stage and an arithmetic mean determined based on the time ratios and the similarity score.

12. The machine-readable medium of claim 11, wherein the arithmetic mean is a weighted arithmetic mean of the time ratios using the similarity scores as weights.

13. The machine-readable medium of claim 10, wherein the user activity data include emails sent or received, phone calls, and meetings.

14. The machine-readable medium of claim 13, wherein the first amount of time, the second amount of time, and the total amount of time spent on the current task up to the determined stage are calculated using at least one of a duration of each phone call, a duration of each meeting, or an estimated duration of time spent on each email sent or received.

15. The machine-readable medium of claim 14, wherein the duration of time spent on each email sent is estimated based on a predetermined time writing a predetermined number of words.

16. The machine-readable medium of claim 14, wherein the duration of time spent on each email received is estimated based on a predetermined time reading a predetermined number of words.

17. The machine-readable medium of claim 10, wherein the one or more characteristics shared between the current task and each of the plurality of completed tasks include one or more of a task value, a task originating region, or a task product mix.

18. The machine-readable medium of claim 10, wherein the current task and each of the plurality of completed tasks include a same set of predetermined stages.

19. A data processing system, comprising:
  a processor; and
  a memory coupled to the processor to store instructions, which when executed by the processor, cause the processor to perform operations for estimating an amount of time spent on a current task and an amount of time required to complete the current task, the operations comprising
    determining, by a server communicatively coupled to a task database system and an activity database system, a stage that the current task has progressed to in a life cycle of the current task, wherein the life cycle of the current task includes a fixed number of predetermined stages;
    invoking an application programming interface (API) using a database query protocol to identify a plurality of completed tasks from the task database system, wherein each of the plurality of completed tasks shares, with the current task, one or more characteristics from a set of characteristics associated with the current task;
    for each of the plurality of completed tasks, calculating a similarity score representing a similarity between the completed task and the current task using a predetermined algorithm that utilizes a different weight for each of the set of characteristics associated with the current task, and calculating a time ratio of a first amount of time over a second amount of time, wherein the first amount of time represents time spent on the completed task after a stage corresponding to the determined stage on the current task, wherein the second amount of time represents time spent on the completed task before the corresponding stage, and wherein each of the first amount of time and the second amount of time is calculated based on user activity data retrieved by the server from the activity database system, wherein the user activity data includes activity data associated with a plurality of users when performing the plurality of completed tasks;

calculating a total amount of time spent on the current task up to the determined stage using data from the activity database system; and calculating the amount of time required to complete the current task based on the similarity score, the time ratio, and the total amount time spent on the current task up to the determined stage.

20. The system of claim 19, wherein the time required to complete the current task is calculated as a product of the total amount time spent on the current task up to the determined stage and an arithmetic mean determined based on the time ratios and the similarity score.

21. The system of claim 20, wherein the arithmetic mean is a weighted arithmetic mean of the time ratios using the similarity scores as weights.

* * * * *